(12) United States Patent
Mukasa et al.

(10) Patent No.: US 8,030,388 B2
(45) Date of Patent: Oct. 4, 2011

(54) VIBRATION-DAMPING MATERIAL

(75) Inventors: Kazuaki Mukasa, Kanagawa (JP); Takeo Hayashi, Kanagawa (JP); Satoshi Yoshinaka, Kanagawa (JP); Takuya Minezaki, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 220 days.

(21) Appl. No.: 12/376,846

(22) PCT Filed: Aug. 7, 2007

(86) PCT No.: PCT/JP2007/065417
§ 371 (c)(1),
(2), (4) Date: Feb. 9, 2009

(87) PCT Pub. No.: WO2008/018444
PCT Pub. Date: Feb. 14, 2008

(65) Prior Publication Data
US 2010/0179267 A1  Jul. 15, 2010

(30) Foreign Application Priority Data
Aug. 9, 2006 (JP) .................................. 2006-216939

(51) Int. Cl.
C08K 3/22 (2006.01)
C08K 3/34 (2006.01)
C08L 67/02 (2006.01)

(52) U.S. Cl. ......... 524/431; 524/449; 524/605; 524/847
(58) Field of Classification Search .................. 524/449, 524/431, 605, 847
See application file for complete search history.

(56) References Cited

U.S. PATENT DOCUMENTS

| | | | | |
|---|---|---|---|---|
| 6,291,574 B1 * | 9/2001 | Gallucci | ........................ | 524/505 |
| 2004/0225048 A1 * | 11/2004 | Miura et al. | .................. | 524/323 |
| 2005/0215703 A1 * | 9/2005 | Mukasa et al. | ................. | 524/601 |
| 2010/0234509 A1 * | 9/2010 | Minezaki et al. | ............. | 524/413 |

FOREIGN PATENT DOCUMENTS

| | | |
|---|---|---|
| EP | 1 571 176 A1 | 9/2005 |
| JP | 3-119063 | 5/1991 |
| JP | 09-241400 | 9/1997 |
| JP | 2006-052377 | 2/2006 |
| JP | 2007-054235 | 3/2007 |
| JP | 2007-056103 | 3/2007 |
| JP | 2007-056104 | 3/2007 |
| WO | WO 95/10563 | 4/1995 |
| WO | WO 01/16231 | 3/2001 |

OTHER PUBLICATIONS

Extended European Search Report, including the Supplementary European Search Report, dated Oct. 20, 2010, for EP Application No. 07792086.6-1214/2050983 PCT/JP2007/065417.

* cited by examiner

*Primary Examiner* — Tae H Yoon
(74) *Attorney, Agent, or Firm* — Antonelli, Terry, Stout & Kraus, LLP.

(57) ABSTRACT

Provided is a vibration damping material, which includes a resin composition obtained by dispersing titanium dioxide (Y) and a mica flake (Z) in a polyester resin (X) containing dicarboxylic acid constitutional units an diol constitutional units, in which: (1) in the polyester resin (X), a ratio of a total of a number of the dicarboxylic acid constitutional units ($A_1$) having an odd number of carbon atoms in a main chain and a number of the diol constitutional units ($B_1$) having an odd number of carbon atoms in a main chain with respect to a total of a number of total dicarboxylic acid constitutional units ($A_0$) and a number of total diol constitutional units ($B_0$), i.e., $[(A1+B1)/(A_0+B_0)]$ is in a range of 0.5 to 1; and (2) a mass ratio (X:Y:Z) of the polyester resin (X), the titanium dioxide (Y), and the mica flake (Z) is in a range of 15 to 40:5 to 30:30 to 80. The vibration damping material is light, has a high vibration damping ability, and exhibits a higher vibration damping ability in a particularly wide range of frequency. Because the vibration damping material does not require use of a carbon powder or the like, the material can also be used in applications and parts that require various color tones, and has high versatility.

14 Claims, No Drawings

VIBRATION-DAMPING MATERIAL

TECHNICAL FIELD

The present invention relates to a vibration damping material mainly formed of a polymeric material, and specifically, to a vibration damping material that is light, has a high vibration damping ability, exhibits a higher vibration damping ability in a wide range of frequency, and has high versatility.

BACKGROUND ART

A vibration damping material has been conventionally used as a material for absorbing vibration energy in parts, where vibration occurs, in a vehicle, a railway car, an aircraft, a household appliance, an OA apparatus, a precision apparatus, a building machine, a construction/building, shoes, a sport gear, and the like.

As a material for absorbing vibration energy such as a vibration damping material, there has been known a soft vinyl chloride-based resin obtained by adding a plasticizer to a vinyl chloride-based resin. The soft vinyl chloride-based resin is designed so as to attenuate the vibration energy by consuming the vibration energy as frictional heat in the resin. However, the absorption and attenuation of the vibration energy by the resin is still insufficient.

Besides, rubber materials such as butyl rubber and NBR have been widely used as the vibration damping material, because those rubber materials are outstanding in terms of processability, mechanical strength, and cost. However, though those rubber materials have the best attenuation performance (transfer-insulating performance or transfer-moderating performance of vibration energy) among general polymeric materials, the vibration damping ability (absorbability of vibration energy) thereof is too low to use the rubber materials solely as the vibration damping material. Thus, to apply the rubber materials, for example, to vibration isolation structure for buildings or apparatuses, the rubber materials have been used in a composite form such as a laminate of the rubber material and a steel plate, or a vibration damping structure formed in combination of the laminate and a lead core that absorbs vibration energy by plastic deformation or an oil damper.

The conventional rubber materials could not be solely used as the vibration damping material as described above, and hence the rubber materials were required to have a composite form. Thus, the vibration isolation structure was inevitably complicated. It has been consequently demanded to enhance the vibration damping abilities of the vibration damping materials themselves and the rubber materials themselves.

In addition, as the vibration damping material, a polyester resin composition having a moiety where the number of carbon atoms between ester linkages in a main chain is odd number is disclosed (JP 2006-052377 A). The polyester resin composition has a good vibration damping ability at room temperature or close to the room temperature, and thus the composition is a promising material as the vibration damping material. However, because a carbon powder is mainly used as a conductive material in the polyester resin, and dispersed with a mica powder or the like, the vibration damping material turns black or brown. Thus, there is a problem in that the composition is unlikely to be used in applications and parts that require various color tones while the vibration damping ability is maintained and improved. Moreover, demanded is a vibration damping material that exhibits a good vibration damping ability in a wider range of frequency.

DISCLOSURE OF THE INVENTION

Problem to be Solved by the Invention

Under the above-mentioned circumstances it is an object of the present invention to, provide a vibration damping material that is light, has a high vibration damping ability, exhibits higher vibration damping ability in a wide range of frequency, and has high versatility.

The inventors of the present invention have intensively studied to achieve the object. As a result, the inventors have found that a vibration damping material using a resin composition meets demands of the above-mentioned object, which is obtained by dispersing titanium dioxide and a mica flake to a polyester resin having a moiety where the number of carbon atoms between ester linkages in a main chain is odd number. The present invention has thus been completed based on the finding.

Means for Solving the Problems

That is, the present invention provides the following vibration damping material.

1. A vibration damping material, including a resin composition obtained by dispersing titanium dioxide (Y) and a mica flake (Z) in a polyester resin (X) containing dicarboxylic acid constitutional units and diol constitutional units, in which: (1) in the polyester resin (X), a ratio of a total of a number of the dicarboxylic acid constitutional units ($A_1$) having an odd number of carbon atoms in a main chain and a number of the diol constitutional units ($B_1$) having an odd number of carbon atoms in a main chain with respect to a total of a number of total dicarboxylic acid constitutional units ($A_0$) and a number of total diol constitutional units ($B_0$), i.e., $[(A_1+B_1)/(A_0+B_0)]$ is in a range of 0.5, to 1; and (2) a mass ratio (X:Y:Z) of the polyester resin (X), the titanium dioxide (Y), and the mica flake (Z) is in a range of 15 to 40:5 to 30:30 to 80.

2. A vibration damping material according to the item 1, in which the dicarboxylic acid constitutional units having an odd number of carbon atoms in the main chain in the polyester resin (X) are units derived from a dicarboxylic acid selected from the group consisting of isophthalic acid, malonic acid, glutaric acid, pimelic acid, azelaic acid, undecanedioic acid, brassylic acid, and 1,3-cyclohexanedicarboxylic acid.

3. A vibration damping material according to the item 1, in which the dicarboxylic acid constitutional units having an odd number of carbon atoms in the main chain in the polyester resin (X) are units derived from isophthalic acid and/or azelaic acid.

4. A vibration damping material according to the item 1, in which a ratio ($A_1/A_0$) of ($A_1$) the number of the dicarboxylic acid constitutional units having an odd number of carbon atoms in the main chain with respect to ($A_0$) the number of the total dicarboxylic acid constitutional units in the polyester resin (X) is in a range of 0.5 to 1.0.

5. A vibration damping material according to the item 1, in which the diol constitutional units having an odd number of carbon atoms in the main chain in the polyester resin (X) are units derived from a diol selected from the group consisting of 1,3-propanediol, 1,3-butanediol, 2-methyl-1,3-propanediol, neopentyl glycol, 1,5-pentanediol, meta-xylene glycol, and 1,3-cyclohexanediol.

6. A vibration damping material according to the item 1, in which the diol constitutional units having an odd number of carbon atoms in the main chain in the polyester resin (X) are units derived from a diol selected from the group consisting of 1,3-propanediol, 1,5-pentanediol, 2-methyl-1,3-propanediol, 1,3-butanediol, and neopentyl glycol.

7. A vibration damping material according to the item 1, in which a ratio ($B_1/B_0$) of ($B_1$) the number of the diol constitutional units having an odd number of carbon atoms in the main chain with respect to ($B_0$) the number of the total diol constitutional units in the polyester resin (X) is in a range of 0.5 to 1.0.

8. A vibration damping material according to the item 1, in which the polyester resin (X) has: (1) an intrinsic viscosity of 0.2 to 2.0 dL/g, which is obtained by measuring at 25° C. in a mixed solvent containing trichloroethane/phenol at a ratio of 40/60 by mass; and (2) a calorie of 5 J/g or less at crystallization exotherm peak under temperature drop conditions, the calorie being measured by using a differential scanning calorimeter.

9. A vibration damping material according to the item 1, in which: a maximum value of a loss factor obtained by measuring a sheet having a thickness of 1.0 mm at 0 to 80° C. at a 500 Hz anti-resonance point by a center excitation method is 0.27 or more; and a temperature range in which the loss factor exceeds 0.1 is 35° C. or higher.

Effects of the Invention

The vibration damping material of the present invention is light, has a high vibration damping ability, and exhibits a higher vibration damping ability in a particularly wide range of frequency.

The vibration damping material of the present invention is a material to which titanium dioxide and a mica flake are added. Because a carbon powder or the like is not needed, the vibration damping material can also be used in applications and parts where various color tones are required, and hence the material has high versatility.

Thus, the vibration damping material of the present invention can be widely used in parts, where vibration occurs, in a vehicle, a railway car, an aircraft, a household appliance, an OA apparatus, a precision apparatus, a building machine, a construction/building, shoes, a sport gear, and the like.

BEST MODE FOR CARRYING OUT THE INVENTION

The present invention is hereinafter described in detail.

A vibration damping material of the present invention is a material formed of a resin composition obtained by dispersing titanium dioxide (Y) and a mica flake (Z) in a polyester resin (X) including dicarboxylic acid constitutional units and diol constitutional units.

First, the polyester resin (X) as a resin component of the vibration damping material of the present invention includes the dicarboxylic acid constitutional units and the diol constitutional units. The polyester resin (X) is required to be as follows: a ratio $[(A_1+B_1)/(A_0+B_0)]$ of the total of ($A_1$) the number of dicarboxylic acid constitutional units having an odd number of carbon atoms in the main chain and ($B_1$) the number of diol constitutional units having an odd number of carbon atoms in the main chain with respect to the total of ($A_0$) the number of total dicarboxylic acid constitutional units and ($B_0$) the number of total diol constitutional units is in the range of 0.5 to 1.0.

In this case, "the number of carbon atoms in the main chain of the dicarboxylic acid constitutional units (or the diol constitutional units)" refers to the number of carbon atoms present in the shortest path along the main chain in the polyester resin in each monomer unit intervened between one ester linkage (—C(=O)—O—) and the next ester linkage. It should be noted that the number of the constitutional units of each component can be calculated from the ratio of the integrated value obtained from the measurement result of $^1$H-NMR spectra described below.

In the present invention, in the polyester resin (X), a ratio of a total of a number of the dicarboxylic acid constitutional units ($A_1$) having an odd number of carbon atoms in a main chain and a number of the diol constitutional units ($B_1$) having an odd number of carbon atoms in a main chain with respect to a total of a number of total dicarboxylic acid constitutional units ($A_0$) and a number of total diol constitutional units ($B_0$), i.e., $[(A_1+B_1)/(A_0+B_0)]$ is in a range of 0.5, to 1, and preferably 0.7 to 1.0. Moreover, the number of carbon atoms of the dicarboxylic acid constitutional units in the main chain and the number of carbon atoms in the diol constitutional units in the main chain are preferably odd numbers of 1, 3, 5, 7, and 9.

Examples of the dicarboxylic acid constitutional units having an odd number of carbon atoms in the main chain in the polyester resin (X) include constitutional units derived from isophthalic acid, malonic acid, glutaric acid, pimelic acid, azelaic acid, undecanedioic acid, brassylic acid, and 1,3-cyclohexanedicarboxylic acid. Of those, the constitutional units derived from isophthalic acid and 1,3-cyclohexanedicarboxylic acid is preferred, and the constitutional unit derived from isophthalic acid is more preferred. The polyester resin (X) may include one or more kinds of constitutional units derived from the above-mentioned dicarboxylic acids. Further, if two or more kinds of constitutional units are included, preferred are those derived from isophthalic acid and azelaic acid.

Examples of the diol constitutional units having an odd number of carbon atoms in the main chain in the polyester resin (X) include constitutional units derived from 1,3-propanediol, 1,3-butanediol, 2-methyl-1,3-propanediol, 1,3-pentanediol, 1-methyl-1,3-butanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, 2-propyl-1,5-pentanediol, meta-xylene glycol, 1,3-cyclohexanediol, and 1,3-bis(hydroxymethyl)cyclohexane. Of those, the constitutional units derived from 1,3-propanediol, 1,3-butanediol, 2-methyl-1,3-propanediol, neopentyl glycol, 1,5-pentanediol, meta-xylene glycol, and 1,3-cyclohexanediol is preferred, and the constitutional units derived from 1,3-propanediol, 1,5-pentanediol, 2-methyl-1, 3-propanediol, 1,3-butanediol, and neopentyl glycol is more preferred. The polyester resin (X) may include one or more kinds of constitutional units derived from the above-mentioned dials.

Further, in the vibration damping material of the present invention, a ratio ($A_1/A_0$) of the number of the dicarboxylic acid constitutional units ($A_1$) having an odd number of carbon atoms in the main chain with respect to the number of total dicarboxylic acid constitutional units ($A_0$) in the polyester resin (X) is preferably in the range of 0.5 to 1.0, and more preferably in the range of 0.7 to 1.0.

In addition, in the vibration damping material of the present invention, a ratio ($B_1/B_0$) of the number of constitutional units ($B_1$) derived from diol with respect to the number of total diol constitutional units ($B_0$) in the polyester resin (X) is preferably in the range of 0.5 to 1.0, and more preferably in the range of 0.7 to 1.0.

In the vibration damping material of the present invention, the polyester resin (X) preferably has: (1) an intrinsic viscosity of 0.2 to 2.0 dL/g, which is obtained by measuring at 25° C. in a mixed solvent containing trichloroethane/phenol at a ratio of 40/60 by mass; and (2) a calorie of 5 J/g or less at crystallization exotherm peak under temperature drop conditions, the calorie being measured by using a differential scanning calorimeter. When the vibration damping material of the present invention satisfies the above-mentioned (1) and (2), a higher vibration damping ability can be obtained.

Note that in addition to the dicarboxylic acid constitutional units and the diol constitutional units described above, the polyester resin (X) to be used in the present invention may further contain other constitutional units in amounts not adversely affecting the effects of the invention. The types of other constitutional units are not limited, and the polyester resin may contain constitutional units derived from any of dicarboxylic acids capable of forming a polyester resin and their esters (referred to as "other dicarboxylic acids"), diols capable of forming a polyester resin (referred to as "other diols"), and hydroxycarboxylic acids capable of forming a polyester resin and their esters (referred to as "other hydroxycarboxylic acids").

Examples of the other dicarboxylic acids include dicarboxylic acids or dicarboxylates such as terephthalic acid, orthophthalic acid, 2-methylterephthalic acid, 2,6-naphthalenedicarboxylic acid, succinic acid, adipic acid, suberic acid, sebacic acid, dodecanedioic acid, 1,4-cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid, and 3,9-bis(2-carboxylethyl)-2,4,8,10-tetraoxaspiro[5.5]undecane; and tri- or more valent polycarboxylic acids such as trimellitic acid, trimesic acid, pyromellitic acid, and tricarbarylic acid or their derivatives.

Examples of the other dials include aliphatic dials such as ethylene glycol, 1,2-propylene glycol, 2-methyl-1,2-propanediol, 1,4-butanediol, 1,6-hexanediol, 2,5-hexanediol, diethylene glycol, and triethylene glycol; polyether compounds such as polyethylene glycol, polypropylene glycol, and polybutylene glycol; tri or more valents polyhydric alcohols such as glycerin, trimethylol propane, and pentaerythritol; alicyclic diols such as 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, 5-methylol-5-ethyl-2-(1,1-dimethyl-2-hydroxyethyl)-1,3-dioxane, pentacyclodecane dimethanol, and 3,9-bis(1,1-dimethyl-2-hydroxyethyl)-2,4,8,10-tetraoxaspiro[5.5]undecane; alkyleneoxide adducts of bisphenols such as 4,4'-(1-methylethylidene)bisphenol, methylenebisphenol (bisphenol F), 4,4'-cyclohexylidene bisphenol (bisphenol Z), and 4,4'-sulfonylbisphenol (bisphenol S); and alkyleneoxide adducts of aromatic dihydroxy compounds such as hydroquinone, resorcin, 4,4'-dihydroxybiphenyl, 4,4'-dihydroxydiphenyl ether, and 4,4'-dihydroxydiphenylbenzophenone.

Examples of the hydroxycarboxylic acids include hydroxybenzoic acid, dihydroxybenzoic acid, hydroxyisophthalic acid, hydroxyacetic acid, 2,4-dihydroxyacetophenone, 2-hydroxyhexadecanoic acid, 12-hydroxystearic acid, 4-hydroxyphthalic acid, 4,4'-bis(p-hydroxyphenyl)pentanoic acid, and 3,4-dihydroxycinnamic acid.

There is no limitation in the method of producing the polyester resin (X) used in the present invention, and conventionally known methods can be employed. In general, the polyester resin is produced by polycondensation of monomers as materials. For example, transesterification or direct esterification conducted by a melt polymerization method or a solution polymerization method can be mentioned. In those methods, there may be used conventionally known transesterification catalysts, esterification catalysts, etherification inhibitors, polymerization catalysts used for polymerization, and stabilizers such as heat stabilizers and light stabilizers, and polymerization adjusters. Mentioned as the transesterification catalysts are compounds containing metals such as manganese, cobalt, zinc, titanium, and calcium. Mentioned as the esterification catalysts are compounds containing metals such as manganese, cobalt, zinc, titanium, and calcium. Mentioned as etherification inhibitors are amine compounds and the like. Examples of the polycondensation catalysts include compounds containing metals such as germanium, antimony, tin, and titanium (e.g., germanium oxide (IV); antimony oxide (III), triphenylstibine, antimony acetate (III); tin (II) oxide; titanates such as titanium (IV) tetrabutoxide, titanium (IV) tetraisopropoxide, titanium (IV) bis(acetylacetonato)diisopropoxide). It is also effective to add, as a heat stabilizer, various phosphorus compounds such as phosphoric acid, phosphorous acid, and phenylphosphonic acid. In addition, light stabilizers, antistatic agents, lubricants, antioxidants, mold release agents, etc., may be added. Examples of the dicarboxylic acid components as a material include the dicarboxylic acids from which the dicarboxylic acid constitutional units are derived and dicarboxylic acid derivatives such as dicarboxylate, dicarboxylic chloride, active acyl derivative, and dinitrile.

In the vibration damping material of the present invention, titanium dioxide (Y) and a mica flake (Z) are dispersed in the polyester resin (X) for improving the ability of the polyester resin (X) to absorb vibration energy.

The type of the titanium dioxide (Y) dispersed in the polyester resin (X) is not particularly limited, and the following titanium dioxides can be used: a titanium dioxide containing only the rutile type or one containing only the anatase type; and a titanium dioxide in which the rutile type and the anatase type are mixed. In addition, as a surface coating treatment agent for suppressing the photocatalytic activity of titanium dioxide, surface treatment agents such as aluminum oxide, silicon oxide, zirconium oxide, zinc oxide, and the like are exemplified. Titanium dioxide having conductivity with a conductive powder being included can also be used for the vibration damping material of the present invention. Titanium dioxide (Y) having an average particle diameter of 0.01 to 0.5 µm is preferred.

In the present invention, the particular use of the titanium dioxide not only gives a vibration damping material having a high vibration damping ability, but also gives an unexpected effect that the temperature range in which the high vibration damping ability is exhibited is widened.

There is no limitation on the kind of the mica flake (Z) dispersed in the polyester resin (X), and a scaly white mica with high vibration energy absorption effect is preferable. In addition, in view of the ease of orientation of the dispersed mica in the vibration damping material, mica having an average particle diameter of 25 to 500 µm is preferred in the vibration damping material of the present invention.

In the vibration damping material of the present invention, the mass ratio (X:Y:Z) of the polyester resin (X), the titanium dioxide (Y), and the mica flake (Z) is in the range of 15 to 40:5 to 30:30 to 80, and of preferably 15 to 25:15 to 25:50 to 70.

The adjustment of the mass ratio of the polyester resin (X) in the vibration damping material to 15 or more enables the following: the effect of improving the vibration damping ability owing to the titanium dioxide and the mica flake is satisfactorily obtained without loss of formability. The adjustment of the mass ratio of the polyester resin (X) in the vibration damping material to 40 or less enables the following: the titanium dioxide and the mica flake are dispersed in the amounts that give a remarkable effect of improving the vibration damping ability without loss of formability.

Further, the adjustment of the mass ratio of the titanium dioxide (Y) in the vibration damping material to 5 or more enables the following: the effect of improving the vibration damping ability owing to the titanium dioxide is remarkably exhibited. The adjustment of the mass ratio of the titanium dioxide (Y) in the vibration damping material to more than 30 results as follows: the improvement of the vibration damping ability is slightly exhibited even though a large amount of the titanium dioxide is contained.

Moreover, the adjustment of the mass ratio of the mica flake (Z) in the vibration damping material to 30 or more gives the following: the effect of improving the vibration damping ability is exhibited. The adjustment of the mass ratio of the mica flake (Z) in the vibration damping material to 80 or less enables the following: the increased amount of the contained mica flake gives the improvement of the vibration damping ability without loss of formability.

The vibration damping material of the present invention is formed of the above-mentioned polyester resin (X), titanium dioxide (Y), and mica flake (Z). However, the vibration damping material may further contain, if necessary, inorganic fillers other than the titanium dioxide and the mica flake and one or more additives. Examples of such additives include dispersants, compatibilizers, surfactants, antistatic agents, lubricants, plasticizers, flame retardants, crosslinking agents, antioxidants, anti-aging agents, weather-resisting agents, heat-resisting agents, processing aids, brighteners, foaming agents, and foaming aids, unless the effects of the present invention are adversely affected. Other resins may be blended into the vibration damping material and the molded articles of the vibration damping material may be surface-treated unless the effects of the present invention are adversely affected.

The vibration damping material of the present invention can be obtained by mixing the polyester resin (X), titanium dioxide (Y), and mica flake (Z). A known method can be used for the mixture thereof. For example, a melt mixing method using a mixing apparatus such as a heat roll, Banbury mixer, twin-screw kneader, or extruder is mentioned. As alternative methods, the followings can be given: the method in which the polyester resin is dissolved into or swelled in a solvent and then dried after being mixed with titanium dioxide and a mica flake; and the method in which each component is mixed in a fine powder form. It should be noted that the addition method of the titanium dioxide, mica flake, additives, etc., the addition order thereof, and the like are not particularly limited.

The above-mentioned constitution provided in the present invention leads to a vibration damping material, in which the maximum value of a loss factor obtained by measuring a sheet having a thickness of 1.0 mm at 0 to 80° C. at a 500 Hz anti-resonance point by a center excitation method is 0.27 or more; and a temperature range in which the loss factor exceeds 0.1 is 35° C. or higher.

Moreover, the vibration damping material of the present invention is mainly formed of a polyester resin component, titanium dioxide, and a mica flake, and hence the material is light and has a high vibration damping ability.

In addition, the vibration damping material of the present invention is characterized in that a high vibration damping ability is obtained in a particularly wide temperature range. Addition of titanium dioxide with a mica flake to a resin component provides not only a vibration damping material having a high vibration damping ability, but also provides a good effect that the temperature range having the vibration damping ability is widened.

In the field of the vibration damping material, it is said that the "temperature-frequency superposition" can be obtained, and hence the widened temperature range leads to a usable widened frequency range.

The "temperature-frequency superposition" means: "complex elastic modulus (both modulus of longitudinal elasticity and of transverse elasticity) of a viscoelastic body such as a polymer material and rubber used as a vibration damping material is a function of temperature T and frequency f. A temperature $T_0$ is set as a standard temperature, and then, complex elastic modulus at a temperature $T_1$ is taken along the axis of ordinate, and frequency is taken along the axis of abscissa (axis of logarithm). It is known that when the complex elastic modulus at the temperature $T_1$ is parallel moved along the axis of abscissa, the complex elastic modulus at the temperature $T_1$ is identical to the complex elastic modulus at the temperature $T_0$. This means that high temperature corresponds to low frequency (long time), and low temperature corresponds to high frequency (short time). As described above, change of temperature can be converted to change of frequency."

That is, a widened temperature range means a widened frequency range having a high vibration damping ability. Thus, the range that can be used as a vibration damping material is widened, and the applications in which the material can be used are expanded. The vibration damping material of the present invention consequently exhibits a good vibration damping ability in a wider range of frequency.

In addition, the vibration damping material of the present invention is obtained by addition of the titanium dioxide with the mica flake to the resin component without use of a carbon powder or the like, and hence the vibration damping material can also be used in applications and parts that require various color tones, and has high versatility.

The vibration damping material of the present invention can thus be formed into or processed into an injection-molded product, a sheet, a film, a fiber, a container, a foam, an adhesive, a coating composition, a vibration damping sheet of constrained type, a vibration damping sheet of unconstrained type, etc, whereby the formed and processed products can be widely used as a vibration isolator, a vibration damper, and a sound-absorbing-insulating material that can be applied to a vehicle, a railway car, an aircraft, a household appliance, an OA apparatus, a precision apparatus, a building machine, a construction/building, shoes, a sport gear, and the like.

EXAMPLES

Hereinafter, examples will be described, but the present invention is not limited the following examples.

The polyester resin and the vibration damping material were evaluated according to the following methods.
(1) Molar Ratio of Constitutional Units of Polyester Resin: [$(A_1+B_1)/(A_0+B_0)$], ($A_1/A_0$), ($B_1/B_0$):

The molar ratio was calculated from a ratio of integrated value of 400 MHz-$^1$H-NMR spectra.
(2) Intrinsic Viscosity of Polyester Resin [η]:

An intrinsic viscosity of polyester resin [η] was measured by dissolving a polyester resin in a 40/60 (mass ratio) trichloroethane/phenol mixed solvent at 25° C. using a Cannon-Fenske viscometer.

(3) Calorie of Crystallization Exotherm Peak under Temperature Drop Conditions of Polyester Resin (ΔHc):

The calorie of crystallization exotherm peak under temperature drop conditions (ΔHc) of the polyester resin was measured by a differential scanning calorimeter "DSC/TA-50WS" manufactured by Shimadzu Corporation. About 10 mg of a sample was placed in an aluminum container without sealing. Then, in a nitrogen gas flow (30 mL/min), the sample was heated to 280° C. at a temperature rise rate of 20° C./min, held at 280° C. for one minute, and then cooled at a temperature drop rate of 10° C./min. The calorie was calculated from the area of the exotherm peak that appeared during the temperature dropping.

(4) Loss Factor of Vibration Damping Material

A vibration damping material was hot-pressed into a sheet having a thickness of about 1 mm. From the sheet, a 10 mm×150 mm test piece was cut out, which was heat-press bonded to a 1 mm-thick substrate (aluminum alloy 5052) or bonded to the substrate by a two-part curable epoxy-based adhesive (trade name: CEMEDINE SG-EPO EP008, manufactured by Cemedine Co., Ltd.) to prepare a vibration damper of unconstrained type. By using a loss factor tester (manufactured by Ono Sokki Co., Ltd.), the obtained vibration damper of unconstrained type was tested for the loss factor at the 500 Hz anti-resonance point in the measuring temperature range of 0 to 80° C. by a central exciting method. The vibration damping ability was evaluated by comparing the maximum values of the loss factor in the measuring temperature range and temperature ranges in which the loss factor exceeds 0.1. It should be noted that as the loss factor is larger, the vibration damping ability is higher.

Example 1

A polyester production apparatus having an internal volume of 30 L and equipped with a packed fractionating column, a stirring fin, a partial condenser, a total condenser, a cold trap, a thermometer, a heater, and a nitrogen gas inlet was charged with: 9,950 g (60.3 mol) of isophthalic acid (manufactured by A.G. International Chemical Co., Inc.); 5,376 g (29.7 mol) of azelaic acid (trade name: EMEROX1144, manufactured by Cognis Co., Ltd., EMEROX1144 containing 93.3 mol % of azelaic acid and 99.97% of dicarboxylic acid in total); and 14,600 g (162 mol) of 2-methyl-1,3-propanediol (manufactured by Dairen Chemical). The mixture was heated to 225° C. under ordinary pressure in a nitrogen atmosphere to undergo esterification for 3.0 hours. After each of the reactive conversions of isophthalic acid and azelaic acid reached 85 mol % or higher while the quantity of the condensed water to be distilled off is observed, 14.3 g of a titanium (IV) tetrabutoxide monomer (manufactured by Wako Pure Chemical Industries, Ltd.) (70.5 ppm of titanium concentration with respect to the total mass of initial condensation product, which is equivalent to the mass obtained by subtracting the mass of the condensed water from the mass of the total loaded material) were added. After both the temperature rise and the pressure reduction were gradually performed, the polycondensation was finally carried out at 240 to 250° C. under 0.4 kPa or lower while 2-methyl-1,3-propanediol was discharged out of the reaction system. The viscosity and stirred torque value of the reaction mixture gradually increased. The reaction was terminated when the melt viscosity reached an appropriate level, or when the distillation of 2-methyl-1,3-propanediol stopped.

The properties of the obtained polyester resin were as follows: [η]=0.71 (dL/g), ΔHc=0 (J/g), $^1$H-NMR [400 MHz, CDCl$_3$, internal standard TMS): δ (ppm)=7.5 to 8.9 (Ph-$\underline{H}$, 4H); 3.5 to 4.6 (—C$\underline{H}_2$—CH(CH$_3$)—C$\underline{H}_2$—, 6H); 1.0 to 2.6 (—CH$_2$CH(C$\underline{H}_3$)C$\underline{H}_2$—, —CH$_2$CH(C$\underline{H}_3$)C$\underline{H}_2$—, —CO(C$\underline{H}_2$)$_7$CO—, 13H).

15 mass % of the polyester resin [(A$_1$+B$_1$)/(A$_0$+B$_0$)=1.0; (A$_1$/A$_0$)=1.0; (B$_1$/B$_0$)=1.0], 15 mass % of titanium dioxide powders (trade name: TIPAQUE CR-80, manufactured by ISHIHARA SANGYO KAISHA, LTD.), and 70 mass % of mica flakes (trade name: CS-060DC, manufactured by Yamaguchi Mica Co., Ltd.) were kneaded at 200° C. using a twin-screw kneader. Table 1 shows the physical properties of the obtained vibration damping material.

Example 2

20 mass % of the polyester resin, which is the same as that used in Example 1, 20 mass % of the titanium dioxide powders (TIPAQUE CR-80), and 60 mass % of the mica flakes (CS-060DC) were kneaded at 200° C. using a twin-screw kneader. Table 1 shows the physical properties of the obtained vibration damping material.

Example 3

25 mass % of the polyester resin, which is the same as that used in Example 1, 25 mass % of the titanium dioxide powders (TIPAQUE CR-80), and 50 mass % of the mica flakes (CS-060DC) were kneaded at 200° C. using a twin-screw kneader. Table 1 shows the physical properties of the obtained vibration damping material.

Example 4

25 mass % of the polyester resin, which is the same as that used in Example 1, 20 mass % of the titanium dioxide powders (TIPAQUE CR-80), 5 mass % of zinc sulfide powders (trade name: RAK-S, manufactured by Sakai Chemical Industry Co., Ltd.), and 50 mass % of the mica flakes (CS-060DC) were kneaded at 200° C. using a twin-screw kneader. Table 1 shows the physical properties of the obtained vibration damping material.

Example 5

20 mass % of the polyester resin, which is the same as that used in Example 1, 20 mass % of titanium dioxide powders (trade name: TIPAQUE CR-60, manufactured by ISHIHARA SANGYO KAISHA, LTD.), and 60 mass % of the mica flakes (CS-060DC) were kneaded at 200° C. using a twin-screw kneader. Table 1 shows the physical properties of the obtained vibration damping material.

Example 6

20 mass % of the polyester resin, which is the same as that used in Example 1, 20 mass % of titanium dioxide powders (trade name: SR-1, manufactured by Sakai Chemical Industry Co., Ltd.), and 60 mass % of the mica flakes (CS-060DC) were kneaded at 200° C. using a twin-screw kneader. Table 1 shows the physical properties of the obtained vibration damping material.

Example 7

20 mass % of the polyester resin, which is the same as that used in Example 1, 20 mass % of titanium dioxide powders (trade name: R-996, manufactured by SICHUAN LOMON TITANIUM INDUSTRY CO. LTD.), and 60 mass % of the mica flakes (CS-060DC) were kneaded at 200° C. using a twin-screw kneader. Table 1 shows the physical properties of the obtained vibration damping material.

Comparative Example 1

39.6 mass % of the polyester resin, which is the same as that used in Example 1, 4 mass % of the titanium dioxide powders (TIPAQUE CR-80), and 60 mass % of the mica flakes (CS-060DC) were kneaded at 200° C. using a twin-screw kneader. Table 2 shows the physical properties of the obtained vibration damping material.

Comparative Example 2

36 mass % of the polyester resin, which is the same as that used in Example 1, 4 mass % of the titanium dioxide powders (TIPAQUE CR-80), and 60 mass % of the mica flakes (CS-060DC) were kneaded at 200° C. using a twin-screw kneader. Table 2 shows the physical properties of the obtained vibration damping material.

Comparative Example 3

36 mass % of the polyester resin, which is the same as that used in Example 1, 4 mass % of the zinc sulfide powders (RAK-S), and 60 mass % of the mica flakes (CS-060DC) were kneaded at 200° C. using a twin-screw kneader. Table 2 shows the physical properties of the obtained vibration damping material.

Comparative Example 4

25 mass % of the polyester resin, which is the same as that used in Example 1, 25 mass % of the zinc sulfide powders (RAK-S), and 50 mass % of the mica flakes (CS-060DC) were kneaded at 200° C. using a twin-screw kneader. Table 2 shows the physical properties of the obtained vibration damping material.

Comparative Example 5

40 mass % of the polyester resin, which is the same as that used in Example 1, and 60 mass % of the titanium dioxide powders (TIPAQUE CR-80) were kneaded at 200° C. using a twin-screw kneader. Table 2 shows the physical properties of the obtained vibration damping material.

Comparative Example 6

40 mass % of the polyester resin, which is the same as that used in Example 1, and 60 mass % of the zinc sulfide powders (RAK-S) were kneaded at 200° C. using a twin-screw kneader. Table 2 shows the physical properties of the obtained vibration damping material.

Comparative Example 7

40 mass % of the polyester resin, which is the same as that used in Example 1, and 60 mass % of zinc oxide powders (trade name: zinc oxide type 1, manufactured by Sakai Chemical Industry Co., Ltd.) were kneaded at 200° C. using a twin-screw kneader. Table 2 shows the physical properties of the obtained vibration damping material.

Comparative Example 8

40 mass % of the polyester resin, which is the same as that used in Example 1, and 60 mass % of the mica flakes (CS-060DC) were kneaded at 200° C. using a twin-screw kneader. Table 3 shows the physical properties of the obtained vibration damping material.

Comparative Example 9

25 mass % of the polyester resin, which is the same as that used in Example 1, and 75 mass % of the mica flakes (CS-060DC) were kneaded at 200° C. using a twin-screw kneader. Table 3 shows the physical properties of the obtained vibration damping material.

Comparative Example 10

20 mass % of the polyester resin, which is the same as that used in Example 1, 20 mass % of calcium silicate powders (trade name: NYGLOSS 4, manufactured by NYCO Minerals, Inc.), and 60 mass % of the mica flakes (CS-060DC) were kneaded at 200° C. using a twin-screw kneader. Table 3 shows the physical properties of the obtained vibration damping material.

Comparative Example 11

20 mass % of the polyester resin, which is the same as that used in Example 1, 20 mass % of silicon dioxide powders (trade name: SILICON DIOXIDE, manufactured by Wako Pure Chemical Industries, Ltd.), and 60 mass % of the mica flakes (CS-060DC) were kneaded at 200° C. using a twin-screw kneader. Table 3 shows the physical properties of the obtained vibration damping material.

Comparative Example 12

20 mass % of the polyester resin, which is the same as that used in Example 1, 20 mass % of calcium carbonate powders (trade name: WHISSCAL A, manufactured by Maruo Calcium Co., Ltd.), and 60 mass % of the mica flakes (CS-060DC) were kneaded at 200° C. using a twin-screw kneader. Table 3 shows the physical properties of the obtained vibration damping material.

Comparative Example 13

36 mass % of the polyester resin, which is the same as that used in Example 1, 4 mass % of conductive carbon powders (trade name: Ketjenblack EC, manufactured by Ketjenblack International Co., Ltd.), and 60 mass % of the mica flakes (CS-060DC) were kneaded at 200° C. using a twin-screw kneader. Table 3 shows the physical properties of the obtained vibration damping material.

TABLE 1

| | Example 1 | Example 2 | Example 3 | Example 4 | Example 5 | Example 6 | Example 7 |
|---|---|---|---|---|---|---|---|
| Blending quantity of vibration damping material (mass %) | | | | | | | |
| Polyester resin (X) | 15 | 20 | 25 | 25 | 20 | 20 | 20 |
| Titanium dioxide (Y) | | | | | | | |

TABLE 1-continued

|  | Example 1 | Example 2 | Example 3 | Example 4 | Example 5 | Example 6 | Example 7 |
|---|---|---|---|---|---|---|---|
| CR80 | 15 | 20 | 25 | 20 |  |  |  |
| CR60 |  |  |  |  | 20 |  |  |
| SR-1 |  |  |  |  |  | 20 |  |
| R996 |  |  |  |  |  |  | 20 |
| Zinc sulfide |  |  |  | 5 |  |  |  |
| Zinc oxide |  |  |  |  |  |  |  |
| Calcium silicate |  |  |  |  |  |  |  |
| Silicon dioxide |  |  |  |  |  |  |  |
| Calcium carbonate |  |  |  |  |  |  |  |
| Conductive carbon (ketjenblack) |  |  |  |  |  |  |  |
| Mica flake (Z) | 70 | 60 | 50 | 50 | 60 | 60 | 60 |
| Measurement/Evaluation results |  |  |  |  |  |  |  |
| (1) Maximum loss factor | 0.27 | 0.31 | 0.31 | 0.37 | 0.32 | 0.33 | 0.29 |
| Temperature at which maximum loss factor is shown (° c.) | 25 | 25 | 25 | 25 | 25 | 25 | 25 |
| (2) Temperature at which loss factor reaches 0.1 |  |  |  |  |  |  |  |
| Low temperature side (° c.) | 9.6 | 9.6 | 9.4 | 10.2 | 9.7 | 9.8 | 9.4 |
| High temperature side (° c.) | 48.7 | 50.5 | 45.8 | 45.4 | 52.3 | 48.9 | 48.6 |
| Temperature range in which loss factor is 0.1 or more (° c.) | 39.1 | 40.9 | 36.4 | 35.2 | 42.6 | 39.1 | 39.2 |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Blending quantity of vibration damping material (mass %) |  |  |  |  |  |  |  |
| Polyester resin (X) | 39.6 | 36 | 36 | 25 | 40 | 40 | 40 |
| Titanium dioxide (Y) |  |  |  |  |  |  |  |
| CR80 | 0.4 | 4 |  |  | 60 |  |  |
| CR60 |  |  |  |  |  |  |  |
| SR-1 |  |  |  |  |  |  |  |
| R996 |  |  |  |  |  |  |  |
| Zinc sulfide |  |  | 4 | 25 |  | 60 |  |
| Zinc oxide |  |  |  |  |  |  | 60 |
| Calcium silicate |  |  |  |  |  |  |  |
| Silicon dioxide |  |  |  |  |  |  |  |
| Calcium carbonate |  |  |  |  |  |  |  |
| Conductive carbon (Ketjenblack) |  |  |  |  |  |  |  |
| Mica flake (Z) | 60 | 60 | 60 | 50 | — | — | — |
| Measurement/evaluation results |  |  |  |  |  |  |  |
| (1) Maximum loss factor | 0.32 | 0.32 | 0.30 | 0.32 | 0.13 | 0.11 | 0.12 |
| Temperature at which maximum loss factor is shown (° C.) | 20 | 20 | 20 | 17.5 | 17.5 | 15.0 | 15.0 |
| (2) Temperature at which loss factor reaches 0.1 |  |  |  |  |  |  |  |
| Low temperature side (° C.) | 7.9 | 8.0 | 9.2 | 9.8 | 11.0 | 10.7 | 11.0 |
| High temperature side (° C.) | 35.3 | 35.4 | 37.2 | 36.1 | 22.0 | 18.9 | 19.5 |
| Temperature range in which loss factor is 0.1 or more (° C.) | 27.4 | 27.4 | 28.0 | 26.3 | 11.0 | 8.2 | 8.5 |

TABLE 3

| | Comparative Example 8 | Comparative Example 9 | Comparative Example 10 | Comparative Example 11 | Comparative Example 12 | Comparative Example 13 |
|---|---|---|---|---|---|---|
| Blending quantity of vibration damping material (mass %) | | | | | | |
| Polyester resin (X) | 40 | 25 | 20 | 20 | 20 | 36 |
| Titanium dioxide (Y) | | | | | | |
| CR80 | | | | | | |
| CR60 | | | | | | |
| SR-1 | | | | | | |
| R996 | | | | | | |
| Zinc sulfide | | | | | | |
| Zinc oxide | | | | | | |
| Calcium silicate | | | 20 | | | |
| Silicon dioxide | | | | 20 | | |
| Calcium carbonate | | | | | 20 | |
| Conductive carbon (Ketjenblack) | | | | | | 4 |
| Mica flake (Z) | 60 | 75 | 60 | 60 | 60 | 60 |
| Measurement/evaluation results | | | | | | |
| (1) Maximum loss factor | 0.12 | 0.30 | 0.27 | 0.27 | 0.26 | 0.27 |
| Temperature at which maximum loss factor is shown (° C.) | 17.5 | 20 | 20 | 20 | 20 | 20 |
| (2) Temperature at which loss factor reaches 0.1 | | | | | | |
| Low temperature side (° C.) | 6.3 | 8.2 | 9.2 | 9.1 | 9.1 | 10.5 |
| High temperature side (° C.) | 35.5 | 39.0 | 37.2 | 37.8 | 35.9 | 42.3 |
| Temperature range in which loss factor is 0.1 or more (° C.) | 29.2 | 30.8 | 28.0 | 28.7 | 26.8 | 31.8 |

Tables 1 to 3 indicate the following: the vibration damping material of the present invention has the maximum loss factor at near normal temperature (25° C.); the vibration damping material has high loss factor and a good vibration damping ability; the temperature range in which the loss factor is 0.1 or more is 35° C. or higher; and the vibration damping material exhibits a good vibration damping ability in a wide range of frequency.

In the vibration damping material of Comparative Examples, the maximum loss factors are 0.3 or more in some cases (Comparative Examples 1 to 3 and 9), but the temperature range in which the loss factor is 0.1 or more is 30° C. or lower inmost cases, and the temperature does not exceed 32° C. The vibration damping material of the present invention therefore has a characteristic that a good vibration damping ability is exhibited in a particularly wide range of frequency.

INDUSTRIAL APPLICABILITY

The vibration damping material of the present invention is light, has a high vibration damping ability, and exhibits a higher vibration damping ability in a particularly wide range of frequency. In addition, the vibration damping material of the present invention is obtained by adding titanium dioxide with a mica flake to a polyester resin component, and use of a carbon powder or the like is not required. Thus, the vibration damping material can also be used in applications and parts that require various color tones, and has high versatility. The vibration damping material of the present invention can be widely used in parts, where vibration occurs, in a vehicle, a railway car, an aircraft, a household appliance, an OA apparatus, a precision apparatus, a building machine, a construction/building, shoes, a sport gear, and the like.

The invention claimed is:

1. A vibration damping material, comprising a resin composition obtained by dispersing titanium dioxide (Y) and a mica flake (Z) in a polyester resin (X) containing dicarboxylic acid constitutional units and diol constitutional units, wherein:
   (1) in the polyester resin (X), a ratio of a total of a number of the dicarboxylic acid constitutional units ($A_1$) having an odd number of carbon atoms in a main chain and a number of the diol constitutional units ($B_1$) having an odd number of carbon atoms in a main chain with respect to a total of a number of total dicarboxylic acid constitutional units ($A_0$) and a number of total diol constitutional units ($B_0$), i.e., $[(A_1+B_1)/(A_0+B_0)]$ is in a range of 0.5, to 1;
   (2) a ratio ($B_1/B_0$) of ($B_1$) the number of the diol constitutional units having an odd number of carbon atoms in the main chain with respect to ($B_0$) the number of the total diol constitutional units in the polyester resin (X) is in a range of 0.5 to 1.0;
   (3) a mass ratio (X:Y:Z) of the polyester resin (X), the titanium dioxide (Y), and the mica flake (Z) is in a range of 15 to 40:5 to 30:30 to 80; and
   (4) the titanium dioxide has an average particle diameter of 0.01 to 0.5 μm.

2. A vibration damping material according to claim 1, wherein the dicarboxylic acid constitutional units having an odd number of carbon atoms in the main chain in the polyester resin (X) are units derived from a dicarboxylic acid selected from the group consisting of isophthalic acid, malonic acid, glutaric acid, pimelic acid, azelaic acid, undecanedioic acid, brassylic acid, and 1,3-cyclohexanedicarboxylic acid.

3. A vibration damping material according to claim 1, wherein the dicarboxylic acid constitutional units having an odd number of carbon atoms in the main chain in the polyester resin (X) are units derived from isophthalic acid and/or azelaic acid.

4. A vibration damping material according to claim 1, wherein a ratio $(A_1/A_0)$ of $(A_1)$ the number of the dicarboxylic acid constitutional units having an odd number of carbon atoms in the main chain with respect to $(A_0)$ the number of the total dicarboxylic acid constitutional units in the polyester resin (X) is in a range of 0.5 to 1.0.

5. A vibration damping material according to claim 1, wherein the diol constitutional units having an odd number of carbon atoms in the main chain in the polyester resin (X) are units derived from a diol selected from the group consisting of 1,3-propanediol, 1,3-butanediol, 2-methyl-1,3-propanediol, neopentyl glycol, 1,5-pentanediol, meta-xylene glycol, and 1,3-cyclohexanediol.

6. A vibration damping material according to claim 1, wherein the diol constitutional units having an odd number of carbon atoms in the main chain in the polyester resin (X) are units derived from a diol selected from the group consisting of 1,3-propanediol, 1,5-pentanediol, 2-methyl-1,3-propanediol, 1,3-butanediol, and neopentyl glycol.

7. A vibration damping material according to claim 1, wherein the polyester resin (X) has:
   (1) an intrinsic viscosity of 0.2 to 2.0 dL/g, which is obtained by measuring at 25° C. in a mixed solvent containing trichloroethane/phenol at a ratio of 40/60 by mass; and
   (2) a calorie of 5 J/g or less at crystallization exotherm peak under temperature drop conditions, the calorie being measured by using a differential scanning calorimeter.

8. A vibration damping material according to claim 1, wherein:
   a maximum value of a loss factor obtained by measuring a sheet having a thickness of 1.0 mm at 0 to 80° C. at a 500 Hz anti-resonance point by a center excitation method is 0.27 or more; and
   a temperature range in which the loss factor exceeds 0.1 is 35° C. or higher.

9. A vibration damping material according to claim 1, wherein a number of carbon atoms of the dicarboxylic acid constitutional units in the main chain, and a number of carbon atoms of the diol constitutional units in the main chain, are odd numbers of 1, 3, 5, 7 and 9.

10. A vibration damping material according to claim 4, wherein said ratio $(A_1/A_0)$ is in a range of 0.7 to 1.0.

11. A vibration damping material according to claim 1, wherein said ratio $(B_1/B_0)$ is in a range of 0.7 to 1.0.

12. A vibration damping material according to claim 1, wherein the mica flake has an average particle diameter of 25 to 500 μm.

13. A vibration damping material according to claim 1, wherein the mass ratio (X:Y:Z) is in a range of 15 to 25:15 to 25:50 to 70.

14. A vibration damping material according to claim 1, wherein the ratio of $[(A_1+B_1)/(A_0+B_0)]$ is in a range of 0.7 to 1.0.

* * * * *